US008718559B2

(12) United States Patent  
Pärssinen et al.

(10) Patent No.: US 8,718,559 B2  
(45) Date of Patent: May 6, 2014

(54) METHOD, APPARATUS AND COMPUTER PROGRAM FOR SENSING SPECTRUM IN A COGNITIVE RADIO ENVIRONMENT

(75) Inventors: Aarno Pärssinen, Espoo (FI); Petri Ikonen, Helsinki (FI); Janne Kukkonen, Vantaa (FI)

(73) Assignee: Nokia Corporation, Espoo (FI)

( * ) Notice: Subject to any disclaimer, the term of this patent is extended or adjusted under 35 U.S.C. 154(b) by 801 days.

(21) Appl. No.: 12/080,984

(22) Filed: Apr. 7, 2008

(65) Prior Publication Data

US 2009/0253376 A1 Oct. 8, 2009

(51) Int. Cl.  
*H04B 15/00* (2006.01)

(52) U.S. Cl.  
USPC ...... 455/62; 455/277.2; 455/454; 375/240.02

(58) Field of Classification Search  
USPC ............. 455/62, 277.2, 454; 375/240.02  
See application file for complete search history.

(56) References Cited

U.S. PATENT DOCUMENTS

| 3,042,800 | A * | 7/1962 | Gluth | 375/345 |
| 4,291,269 | A * | 9/1981 | Nossen | 324/76.47 |
| 4,398,286 | A * | 8/1983 | Geesen et al. | 370/492 |
| 6,201,955 | B1 * | 3/2001 | Jasper et al. | 455/277.2 |
| 7,710,919 | B2 | 5/2010 | Woo et al. | |
| 2006/0067354 | A1 * | 3/2006 | Waltho et al. | 370/433 |
| 2007/0079339 | A1 * | 4/2007 | Hanabusa | 725/73 |
| 2007/0091998 | A1 * | 4/2007 | Woo et al. | 375/240.02 |
| 2008/0069041 | A1 | 3/2008 | Tandai et al. | 370/329 |
| 2008/0137634 | A1 | 6/2008 | Hassan et al. | 370/343 |
| 2009/0161610 | A1 | 6/2009 | Kang et al. | 370/329 |

FOREIGN PATENT DOCUMENTS

| CN | 1829385 A | 9/2006 |
| CN | 1956365 A | 5/2007 |
| GB | 2431548 A | 4/2007 |
| GB | 2447148 A | 9/2008 |
| KR | 20070041343 A | 4/2007 |
| WO | WO 2007/094604 A1 | 8/2007 |

OTHER PUBLICATIONS

Hatkin, S., "Cognitive Radio: A look into the future of wireless communications and engineering challenges presented by its implementation", Apr. 2006, McMaster University, 12 pgs.  
Laskar, J., et al., "Reconfigurable RFICs and Modules for Cognitive Radio", © 2006, IEEE, pp. 283-286.

(Continued)

*Primary Examiner* — Edward Urban  
*Assistant Examiner* — Hsin-Chun Liao  
(74) *Attorney, Agent, or Firm* — Harrington & Smith

(57) ABSTRACT

To find frequency slots over which a cognitive radio can send an opportunistic transmission, a wideband spectrum is searched with a lower resolution to identify bandwidth slices having low or no signal levels. The identified bandwidth slices are searched with a higher resolution and candidate frequency slices are selected as those bandwidth slices having the least signal levels after the higher resolution searching, and ranked from the lowest signal level to the highest. A spectrum detection algorithm is executed on the selected candidate frequency slices in the order of the rank until it is decided that one of them has sufficiently free spectrum. A transmission is then opportunistically sent on the decided candidate frequency slice. Ongoing to the searching, intermittent signals are detected and a band about them is searched with the lower resolution to determine if the band about the detected intermittent signal is an identified bandwidth slice. Various techniques are shown for how the fine search is conducted.

27 Claims, 5 Drawing Sheets

(56) References Cited

OTHER PUBLICATIONS

Yang, J., et al., "Addressing the Dynamic Range Problem in Cognitive Radios", © 2007, IEEE, pp. 5183-5188.
Luu, L., et al., An Adaptive Weaver Architecture Radio with Spectrum Sensing Capabilities to Relax RF Component Requirements, © 2007, IEEE, pp. 538-545.
Lunden, J., et al., "Censoring for Collaborative Spectrum Sensing in Cognitive Radios", Proc. Of the 41$^{st}$ Asilomar Conference on Signals, Systems, and Computer, Pacific Grove, CA, USA, Nov. 4-7, 2007, 6 pgs.
Chia-Han Lee et al. "Multiple Access-Inspired Cooperative Spectrum Sensing for Cognitive Radio," Oct. 29, 2007, pp. 1-6, XP031232378.
Hyoungsuk Jeon et al. "Notification Protocol of Sensing Information in Cognitive Radio System," Sep. 21, 2007, pp. 1377-1380, XP031261523.
Paulo Marques et al. "Sensing Opportunities in UMTS Spectrum," Aug. 1, 2007, pp. 492-496, XP031276097.
Tao Luo et al. "Maximum Likelihood Ratio Spectrum Dectedtion Model for Multicarrier Modulation Based Cognitive Radio Systems," Sep. 1, 2007, pp. 1698-1701, XP031147697.
Ghurumuruhan Ganesan et al. "Spatiotemporal Sensing in Cognitive Radio Networks," Sep. 1, 2007, pp. 1-5, XP031168098.
Ganesan G et al. "Agility improvement through cooperative diversity in cognitive radio," Nov. 28, 2005, pp. 2505-2509.
Carlos Cordeiro et al., "IEEE 802.22: The First Worldwide Wireless Standard Based on Cognitive Radios", IEEE International Symposium on New Frontiers in Dynamic Spectrum Access Networks, Nov. 8, 2005, pp. 328-337, XP010855130.

\* cited by examiner

METHOD, APPARATUS AND COMPUTER PROGRAM FOR SENSING SPECTRUM IN A COGNITIVE RADIO ENVIRONMENT

CROSS REFERENCE TO RELATED APPLICATION

This application includes subject matter related to the following U.S. patent applications: Ser. No. 12/001,623 filed on Dec. 11, 2007 and entitled METHOD AND APPARATUS TO SELECT COLLABORATING USERS IN SPECTRUM SENSING; and Ser. No. 12/080,693 filed on Apr. 3, 2008 and entitled METHOD, APPARATUS AND COMPUTER PROGRAM FOR SELF-ADJUSTING SPECTRUM SENSING FOR COGNITIVE RADIO.

TECHNICAL FIELD

The teachings herein relate generally to wireless networks and devices operating in such networks, and are particularly related to sensing spectrum used in the network such as to avoid interference or otherwise manage spectrum usage.

BACKGROUND

Spectrum sensing is needed in cognitive radios to find empty slots in the radio spectrum which can subsequently be used in an opportunistic manner. Traditionally radio spectrum is divided between different radio systems in a manner that strictly allocates a specific band to a specific system. This strict allocation will be changing to a more flexible spectrum utilization at least in some frequency bands in the future. Primary users are those operating within the more formal networks such as hierarchical networks (e.g., WLAN or cellular such as GSM, GERAN, UTRAN and E-UTRAN) and ad hoc networks (e.g., WiFi). Secondary users are those operating outside the structure of the formal networks. Since essentially all spectrum in crowded areas that is useable by mobile terminals is allocated to some formal network or another, the secondary users find and utilize portions of the existing networks' spectrum in an opportunistic manner. Consequently, two related obstacles face the secondary user: it must not interfere with the primary users, and it must somehow find those portions of the spectrum not currently in use by any of the formal networks. For this latter reason the secondary users are generally referred to as cognitive users; they must be spectrum-aware rather than simply using the radio resources allocated by some access node controlling a cell of users.

The secondary user/cognitive radio therefore utilizes or exploits a free region of spectrum for its own transmissions, outside control of the formal networks. By "free" is meant that the primary users/formal networks are not using the spectrum region in question when considering time, frequency and space. Alternatively there could be a band that is dedicated to several radio systems operating under a certain set of rules or policies. The common factor in any case is that the radio spectrum will have to be sensed somehow in order for the cognitive radio/secondary user to locate the free spectral band. This sensing has to at least take into account time, frequency and space.

The cognitive radio must be able to detect a primary user and avoid causing interference to it. Since cognitive radio is a wireless application, the cognitive radios have a limited power supply and so an important consideration in spectrum sensing is to minimize power usage. It is not inconsistent that the actual mobile terminals operating within the formal network(s) may act as the cognitive radios that also sense the spectrum quality, but the spectrum sensing task may also be undertaken by the cognitive radios operating wholly outside those networks' formal structure but utilizing the free radio resources opportunistically.

In theory the spectrum sensing task can be shared among various cognitive users in order to obtain savings in power consumption at the individual mobile users, to reduce the amount of data to be transmitted by those individual users, and consequently to facilitate the use of simpler sensing techniques in each individual user as compared to having individual terminals measure the entire spectrum in use across the network. One practical problem with collaboration is that the selection, control, and resultant handling of the collaborative nodes represent a control signaling overhead that occupies additional bandwidth because the collaborative nodes need to be controlled independently. Thus the potential spectrum savings by allocating bandwidth more efficiently in view of the spectrum sensing by the mobile terminals is offset, often more than offset, by the coordination required to get those mobile terminals to sense portions of the spectrum. This is particularly true when one tries to incorporate diversity into spectrum sensing so as to avoid the hidden node problem. Teachings relevant to collaborative spectrum sensing in a cognitive network may be seen more particularly at co-owned U.S. patent application Ser. No. 12/001,623, filed on Dec. 11, 2007 and entitled "Method and Apparatus to Select Collaborating Users in Spectrum Sensing".

Being a very forward-looking technology at this stage of development, there is not a great volume of prior art in the spectrum sensing field. Three are detailed here. In a first proposal set forth by L. Luu and B. Daneshrad in a paper entitled *An Adaptive Weaver Architecture Radio With Spectrum Sensing Capabilities to Relax RF Component Requirements* [IEEE JOURNAL ON SELECTED AREAS IN COMMUNICATIONS, VOL. 25, No. 3, APRIL 2007], there is an adaptive Weaver receiver architecture containing a coarse spectrum sensing method. It uses variable LO-frequencies to enhance image-rejection. It is seen, however, as doing only a few frequency sweeps with simple power detection to measure the level of the signal at the image frequency, and so it is not seen as able to do a complete wide-band spectrum sensing operation.

A second paper by J. Laskar, et al, entitled *Reconfigurable RFICs and Modules for Cognitive Radio* [SiRF, 2006] presents a sensing method which is based on a coarse detection with wavelet transformation and then on a fine detection that uses an analog auto-correlation. It may in principle be suitable for the spectrum sensing task for cognitive radio applications at least with some properties. Few details are presented though and so it is difficult to find a workable solution for the specific cognitive radio problem. For example, this paper does not address the time-division of signals under detection in any way.

A third approach was presented by J. Yang, entitled *Addressing the dynamic range problem in cognitive radios* [Berkeley Wireless Research Center (BWRC) summer retreat, May 31, 2007, published in ICC conference, July 2007] proposed a search for the highest amplitude peak over the frequency from the wideband spectrum with a low resolution, high-speed analog to digital converter ADC and correlator. This proposal then cancels the result from the original signal before a second digital conversion that uses also the high-speed, low resolution ADC. It appears to the inventors that the dynamic range for the second ADC is significantly reduced in this proposal, though the wide-band signal may still be converted completely.

What is needed in the art is a way to find those free areas that may be located anywhere among the wideband spectrum at various times with low power requirements and high confidence level.

SUMMARY

In accordance with one embodiment of the invention there is a method that includes searching a wideband spectrum with a first (lower) resolution to identify bandwidth slices having low or no signal levels and searching the identified bandwidth slices with a second (higher) resolution and selecting as candidate frequency slices those bandwidth slices having the least signal levels after the second resolution searching. The method further includes executing a spectrum detection algorithm on at least one of the selected candidate frequency slices and deciding that it has sufficiently free spectrum, and then transmitting in the decided candidate frequency slice.

In accordance with another embodiment of the invention there is an apparatus that includes a coarse power detector, a fine power detector, a spectrum detector, a processor and a transmitter. The coarse power detector is configured to search a wideband spectrum with a first (lower) resolution to identify bandwidth slices having low or no signal levels. The fine power detector is configured to search the identified bandwidth slices with a second (higher) resolution and to select as candidate frequency slices those bandwidth slices having the least signal levels after the second resolution searching. The spectrum detector is configured to execute a spectrum detection algorithm on at least one of the selected candidate frequency slices. The processor is configured to decide that at least one of the selected candidate frequency slices has sufficiently free spectrum. And the transmitter is configured to transmit in the decided candidate frequency slice.

In accordance with another embodiment of the invention there is a computer readable memory embodying a program of machine-readable instructions executable by a digital data processor to perform actions directed toward searching spectrum for a frequency band available for transmission. In this embodiment the actions include searching a wideband spectrum with a first (lower) resolution to identify bandwidth slices having low or no signal levels and searching the identified bandwidth slices with a second (higher) resolution and selecting as candidate frequency slices those bandwidth slices having the least signal levels after the second resolution searching, and thereafter executing a spectrum detection algorithm on at least one of the selected candidate frequency slices and deciding that it has sufficiently free spectrum.

In accordance with another embodiment of the invention there is an apparatus that includes first searching means for searching a wideband spectrum with a first (lower) resolution to identify bandwidth slices having low or no signal levels, second searching means for searching the identified bandwidth slices with a second (higher) resolution and selecting as candidate frequency slices those bandwidth slices having the least signal levels after the second resolution searching, detect means for detecting spectrum of at least one of the selected candidate frequency slices, processing means for deciding that at least one of the selected candidate frequency slices has sufficiently free spectrum, and transmit means for transmitting in the decided candidate frequency slice. In a particular embodiment, the first searching means is coarse detection circuitry 304, the second searching means is fine detection circuitry 306, the detect means is an embodied spectrum sensing block 308 that runs a spectrum detection algorithm, and the transmit means is a transmitter 10D.

These and other aspects of the invention are detailed more particularly below.

BRIEF DESCRIPTION OF THE DRAWINGS

The foregoing and other aspects of these teachings are made more evident in the following Detailed Description, when read in conjunction with the attached Drawing Figures.

DETAILED DESCRIPTION

The inventors' solution to the problem formulated above, in an embodiment, breaks the spectrum sensing operation into three main parts: coarse wideband spectrum sensing; narrowing the band and doing a power analysis of that narrower band to find a candidate band; and finally analyzing the selected candidate band for free spectrum. In this embodiment there is also a low power envelope detector constantly operating in the background to detect signals which emerge at long intervals. This envelope detector then gives information that triggers spectrum sensing when necessary to detect those infrequently appearing signals.

The teachings herein detail sensing the surrounding radio spectrum and how to find a free slot from there. As noted above, an important requirement in mobile applications (in addition to the basic functionality) is the power consumption. These teachings are in the context of spectrum sensing and finding a free slot in a power-efficient manner, and also in an approach that is suitable for mobile terminals. The inventors have determined that a significant bottleneck in the mobile terminals lies in the analog to digital A/D conversion. It is at this juncture where the engineering tradeoffs among speed, resolution and power will not allow a purely digital solution with the current or foreseeable technologies that are suitable for small (handheld) mobile devices. This is not to say that these teachings are limited only to handheld mobile devices, but only that they are particularly advantageous for them.

Figure 1A:
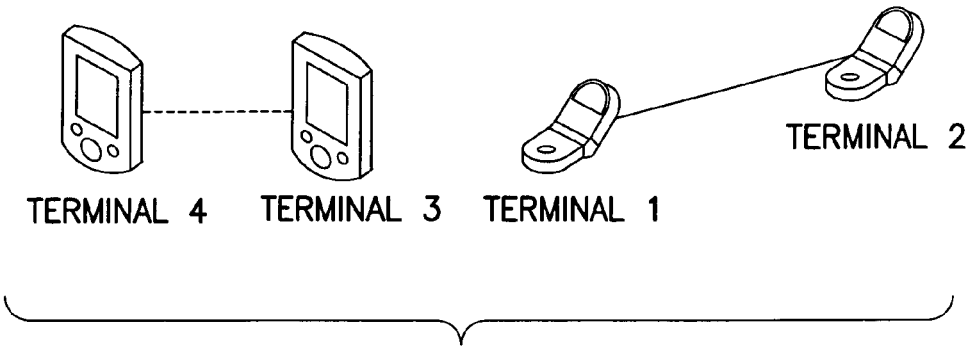
FIG. 1A illustrates two pairs of terminals communicating as cognitive radio pairs.
Figure 1B:
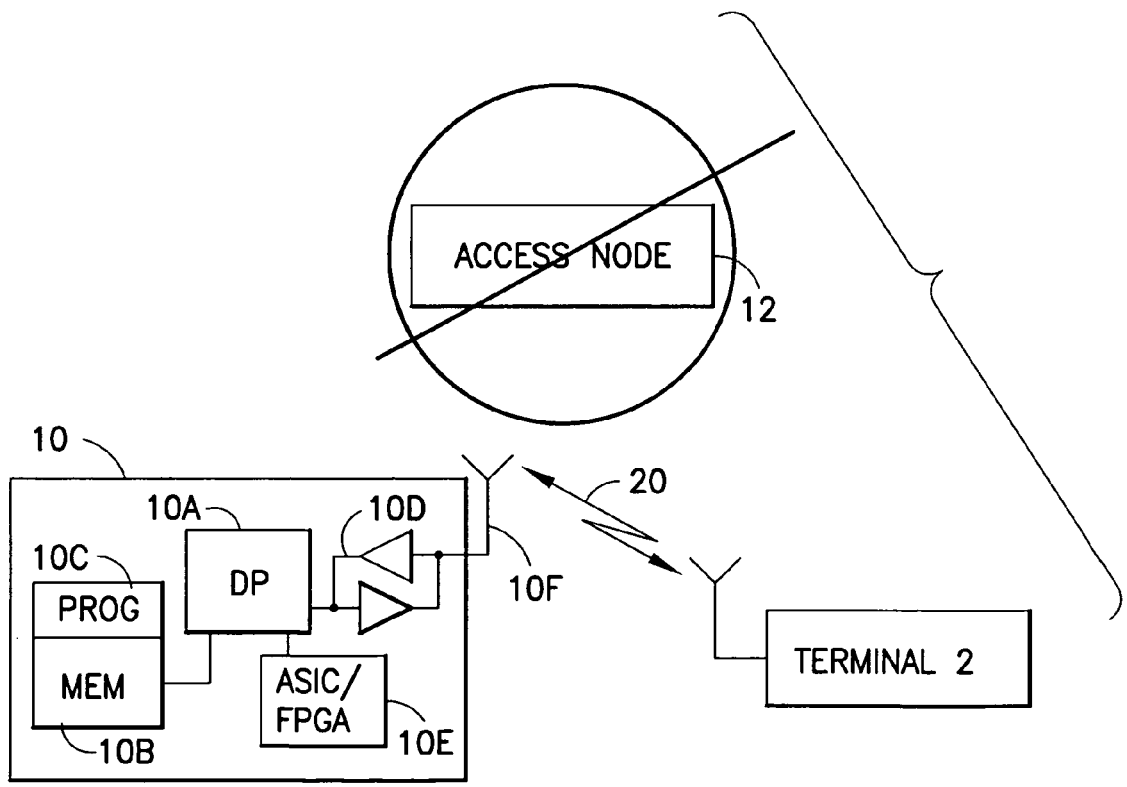
FIG. 1B shows two cognitive terminals communicating without an access node with high-level details of one of the terminals shown schematically.

Prior to detailing the various embodiments and aspects of the invention further, some general information as to the cognitive radio and its environment are presented at FIGS. 1A-1B. FIG. 1A shows two pairs of cognitive radios each forming their own cognitive network. Note that there is no access node involved; terminals 1 and 2 communicate directly with one another opportunistically using the free spectrum they found, and terminals 3 and 4 do the same using the free spectrum that they have found. Each one of the pairs of cognitive radios are of the same rank in their own network. Being of the same rank excludes a master-slave relation between them as with Bluetooth devices, though different cognitive radios may each refer to some common timing reference for synchronous operation between them. Additionally, each one of the cognitive radios in both of the cognitive networks are all of the same rank, so all are in competition for the same free spectrum. Each of the four cognitive radios are responsible for using that free spectrum in a manner that does not interfere with primary users who may be operating in the same geographic area, a principle that gives rise to the spectrum sensing task itself.

FIG. 1B shows an exemplary high level block diagram of one of the cognitive terminals 10 of FIG. 1A which is in communication with another cognitive terminal, terminal 2. Also shown is a network access node 12, blocked out to make clear that these diagrams refer to cognitive radios operating on an opportunistic basis and not according to an ad-hoc or hierarchical network protocol. A cognitive radio may be in communication with the access node 12, but for the opportunistic cognitive network communications it is not allocated radio resources or a defined contention time during which it competes for resources by that access node. The cognitive radio terminal 10 includes a data processor (DP) 10A, a memory (MEM) 10B that stores a program (PROG) 10C, and a suitable radio frequency (RF) transceiver 10D coupled to one or more antennas 10F (one shown) for bidirectional wireless communications over one or more wireless links 20 with the other cognitive radio terminal 2. The cognitive radio 10 may also include, as embodiments of the invention, an application specific integrated circuit ASIC and/or field programmable gated array FPGA 10E coupled to or as a part of the DP 10A. It is understood that terminal 2 may also have similar hardware as is shown for the terminal 10, though it is not necessary for operation of the detailed terminal 10 that terminal 2 sense spectrum used for the link 20 in the same manner.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

The PROG 10C is assumed to include program instructions that, when executed by the DP 10A, enable the cognitive radio terminal 10 to operate in accordance with the exemplary embodiments of this invention, as detailed above. Inherent in the DP 10A is a local clock to enable synchronism among the various terminals, which is important in some cognitive radio architectures. The PROG 10C may be embodied in software, firmware and/or hardware, as is appropriate. In general, the exemplary embodiments of this invention may be implemented by computer software stored in the MEM 10B and executable by the DP 10A of the terminal 10, or by hardware (e.g., ASIC 10E or other firmware circuitry), or by a combination (e.g., FPGA 10E) of software and/or firmware and hardware in the terminal 10.

In general, the various embodiments of the terminal 10 can include, but are not limited to, mobile terminals/stations, cellular telephones, personal digital assistants (PDAs) having wireless communication capabilities, portable computers (e.g., laptops) having wireless communication capabilities, image capture devices such as digital cameras having wireless communication capabilities, gaming devices having wireless communication capabilities, music storage and playback appliances having wireless communication capabilities, as well as portable units or terminals that incorporate combinations of such functions and sensor networks.

The MEM 10B may be of any type suitable to the local technical environment and may be implemented using any suitable data storage technology, such as semiconductor-based memory devices, magnetic memory devices and systems, optical memory devices and systems, fixed memory and removable memory. The DP 10A may be of any type suitable to the local technical environment, and may include one or more of general purpose computers, special purpose computers (e.g., the ASIC/FPGA 10E), microprocessors, digital signal processors (DSPs) and processors based on a multi-core processor architecture, as non-limiting examples.

Now are detailed certain aspects of the invention that were generally stated above. Recall that in an embodiment of the invention the spectrum sensing operation can be divided into three main portions. First, a coarse wideband spectrum sensing, then narrowing the band and doing a finer band power analysis. Finally the selected candidate band is fed to a spectrum detection algorithm and carefully analyzed. In addition to these a low power envelope detector is constantly in the background detecting signals which emerge at long intervals and then give information that triggers spectrum sensing when necessary to detect these infrequently appearing signals. The spectrum sensing steps are presented in more detail below, but recall that the low power envelope detection operation may be continually operating throughout all or only some of the three stages detailed below. The radio frequency RF envelope detector can be used as controlling the RF gains of the first and second stages (both coarse and fine spectrum sensing branches) to reduce the dynamic ranges of A/D conversions. This information can be also used to aid the spectrum hole search process.

The first stage is coarse sensing over a wideband spectrum. Generically this is considered as searching a wideband spectrum with low resolution to identify bandwidth slices having low or no signal levels. Wideband coarse spectrum sensing can be done with a high speed and low resolution analog to digital converter ADC combined with digital signal analysis (using a fast Fourier transform FFT or equivalently a discrete Fourier transform DFT, for example). This gives a snapshot of the complete spectrum under study, and the low resolution conserves battery power in the mobile device. Higher resolution over a wide bandwidth would be quite power intensive.

The term wideband spectrum does not imply (nor does it exclude) the whole frequency band over which the cognitive radio CR is capable of receiving, but is a relative term in view of other portions of that wideband spectrum that are identified, selected and decided below in the other stages. It may in fact be the entire frequency band over which the CR is capable of receiving or it may be something less. For example, the scope of the wideband can be decided in co-operation with other CRs (e.g., limiting the wideband to only those frequencies both CRs can receive where one CR has lesser frequency capabilities than the other), it can be decided autonomously by the individual CR based on knowledge of signal activity in the area in which it operates (e.g., it excludes certain bandwidths due to its past experience or information it received that those bandwidths in this particular geographic area are generally not productive for finding free spectrum, such as the UTRAN frequencies in a city).

Similarly, The terms higher and lower resolution are relative to one another rather than absolute. Resolution in the wideband search gives a certain granularity, and resolution in the narrower band search gives a different granularity. So long as the granularity of the wideband search is less than that of the narrower band search, the wideband search is of lower resolution.

Still within the low resolution wideband search, the coarse power measurement may be enhanced in an embodiment according to frequency bins. A frequency bin simply refers to a slice of the wideband spectrum that is determined from the sampling frequency fs at the ADC. For example, a first frequency bin may be defined from 0 Hz to fs, a second frequency bin defined from fs to 2*fs, a third frequency bin may be defined from 2*fs to 3*fs, and so on for the entire wideband spectrum. Note that processing by frequency bins is simply a convenient way to parallelize the wideband processing; the total of all the frequency bins spans the wideband spectrum and so there is no narrowing of the wideband or of individual bins yet. Processing by frequency bins is important because of the folding of spectrum due to frequency sampling at the ADC. The analysis of the frequency bins to find those with the least or no signal level (least again being relative to other frequency bins) can be implemented for example with a FFT block. Note that since the frequency bins span the wideband spectrum, this FFT per frequency bin is simply an implementation of the low resolution wideband spectrum searching that is more broadly stated above. However, it is noted that in certain cases (e.g., with a sufficiently high ADC sampling speed) the frequency bin processing may be dispensed with in favor of serially sampling the wideband spectrum.

At this stage of the signal processing there are what is termed bandwidth slices (to avoid confusion with the term frequency bin though the two imply the same concept) of the wideband spectrum, and for each bandwidth slice it is known with low granularity the signal levels within that slice. Signal level may be defined in different ways according to what is deemed most successful at finding the spectrum holes; it may be volume of signal activity, it may be signal strength, but most appropriately it is a combination; signals with higher strength are weighted according to that strength so as to minimize the influence of Gaussian noise signals on the spectrum sensing process. The weighted signals within a bandwidth slice are summed to get a net result. This net result is then the 'signal level' for that bandwidth slice. In this coarse wideband processing stage, the extent of the wideband is limited by eliminating some of those bandwidth slices that have the higher signal level, since the goal is to find free spectrum. So entering the next stage we have only those bandwidth slices that are identified as having low or no signal levels and we do not expend further processing or battery power on further examining the slices with higher signal levels.

Figure 3A:
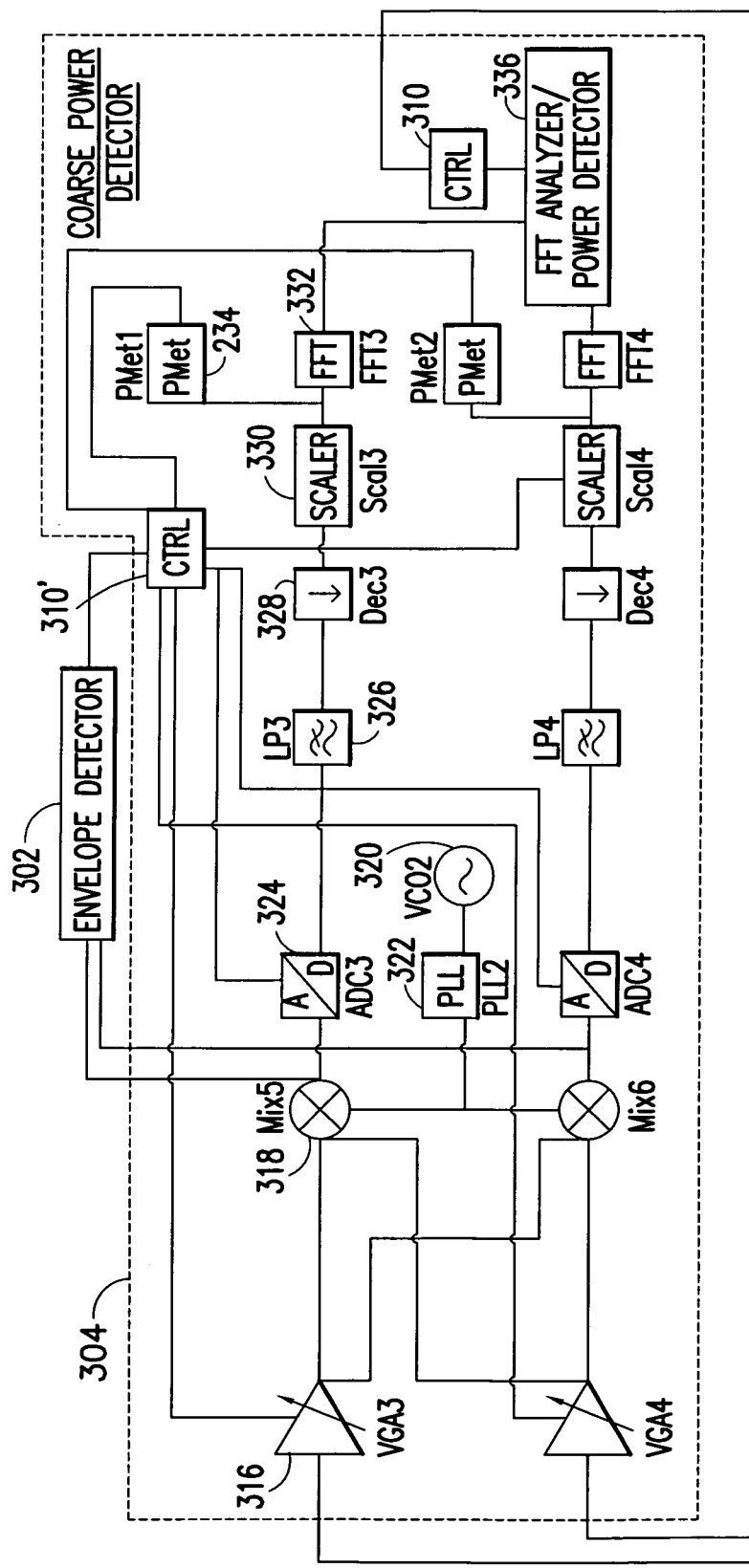
FIG. 3 is similar to FIG. 2 but showing substantially more detail for the cognitive terminal according to an embodiment of the invention.
Figure 3A:
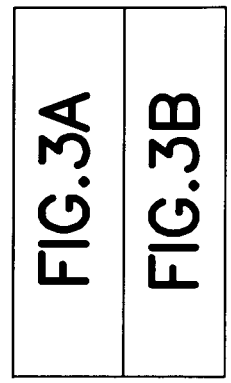
Figure 3B:
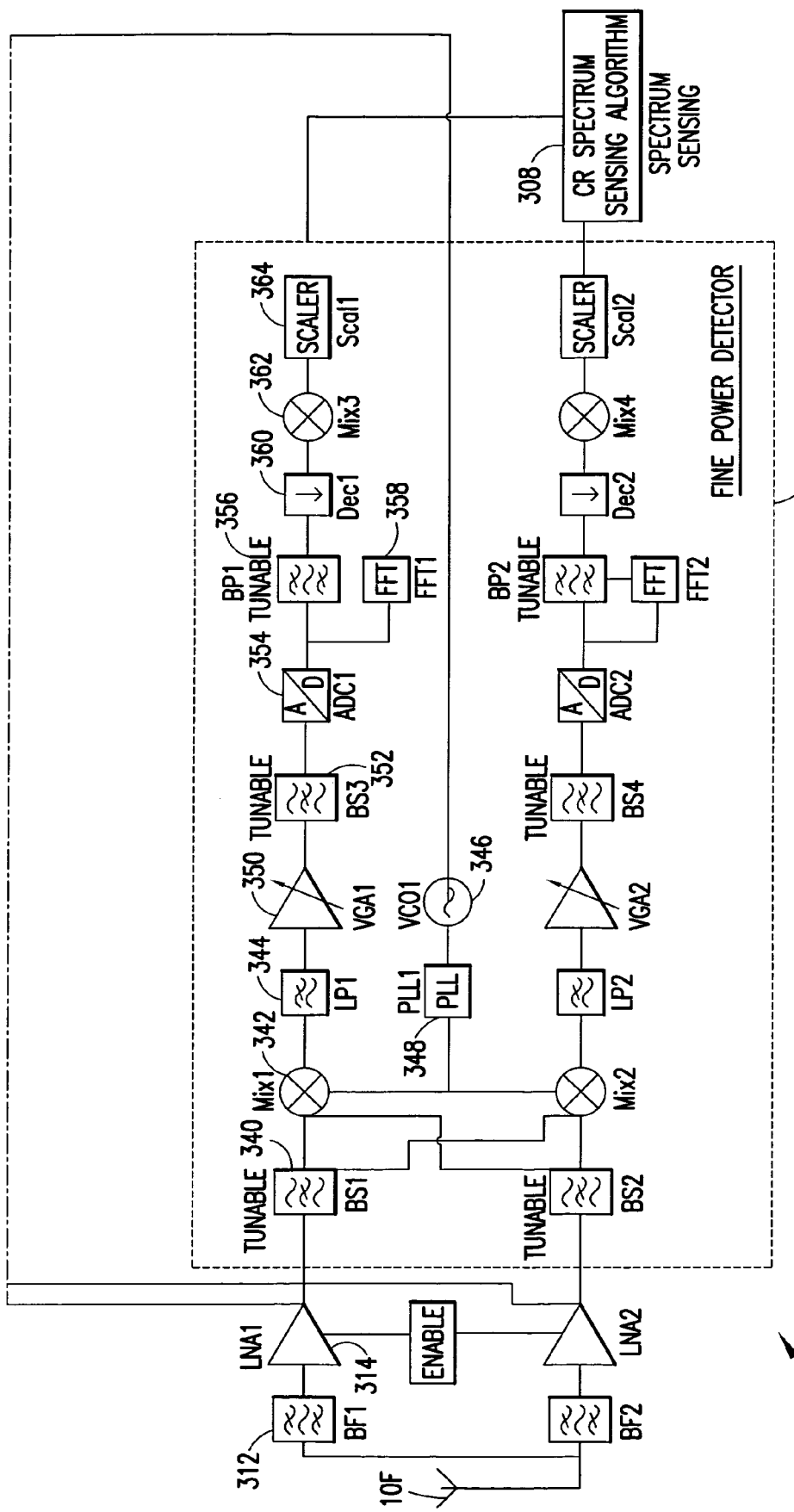

In the second stage of the spectrum sensing processing is a gradual search of those identified bandwidth slices with no or low signal levels. More generally, the identified bandwidth slices are searched with a higher resolution than was used to coarse-search the wideband spectrum, and candidate frequency slices are selected as those bandwidth slices having the least signal level after the higher resolution searching. This higher resolution searching can be done in a number of ways, including (but not limited to):

a) narrowing filter bandwidths
 b) tuning local oscillator LO-frequencies
 c) increasing ADC resolution and reducing bandwidth
 d) changing ADC sampling rate
 e) tuning FFT parameters
 f) canceling RF interferers with analog means
 g) canceling RF interferers with digital means All of these searching techniques can be implemented by configuring the specific blocks shown at FIG. 3 to different modes of operation. It is noted that some of these (e.g., narrowing filter bandwidth and tuning LO frequencies particularly) will result in also narrowing the band of interest from the extent of the bandwidth slice that existed at the close of the first coarse-sensing stage. The candidate frequency slices need not have the same bandwidth as the bandwidth slices from which they were derived, because in some implementations a higher signal level will be near the edge of a bandwidth slice and narrowing the slice to eliminate those higher signal levels might drastically reduce the net signal level across the narrower slice. This is a fairly power efficient way to sense the spectrum and so certain implementations narrow the range of the identified bandwidth slices in the high-resolution stage of processing. The second stage may use any one or a combination of the above exemplary searching techniques.

Further in the second stage the most promising candidate frequency slices are selected. Just as in the first coarse-sensing stage, the overall bandwidth under consideration at the close of the second stage is reduced by eliminating those slices with higher signal level. The candidate frequency slices are selected and ranked in increasing order of signal level from lowest (or zero) to highest. These candidate frequency slices are then reduced in number as compared to the number of selected bandwidth slices that began the higher resolution processing in the second stage, regardless of whether or not the range per slice is narrowed during the second stage processing. When narrowed sufficiently it may be convenient to term these candidate frequency slices as candidate channels.

At the close of the second processing stage then is a ranked order of the candidate frequency slices (channels) from the lowest signal level to the highest. The third processing stage is simple; execute a spectrum detection algorithm on the slices in the order of the priority ranking until one is found that is decided to have sufficiently free spectrum. There are several spectrum detection algorithms known in the art and more sure to be developed as the cognitive radio concept becomes closer to practical deployment, and these teachings are not limited to any particular one whether implemented in software, hardware, firmware, or some combination. One well known algorithm is cyclostationary feature detection, for example. This is a fairly power intensive function, and so for the handheld terminal application the rank order is important; parallel processing of multiple candidate slices is seen to be too power inefficient. Once a decision is made from the spectrum detection stage that one of the candidate frequency slices is suitable (i.e., it has enough free spectrum), then the cognitive terminal transmits in the decided candidate frequency slice.

Exactly where the cutoff is to decide what is sufficiently free spectrum is for the CR to decide. At early stages of cognitive radio development the threshold might be much higher than at later stages when the general principles are set and more advances are made to fine-tuning which would enable the CRs to exploit ever smaller portions of free spectrum. However defines, it is convenient that the CR has stored in its local memory a threshold for what is considered enough free spectrum. Then the decision is based on comparing the stored threshold to the output of the third stage spectrum detection algorithm for each candidate slice in turn, another low-power operation. The stored threshold may be a fixed value or may be a function of different parameters (e.g., size of candidate slice, remaining battery power in the CR, etc.).

Figure 2:
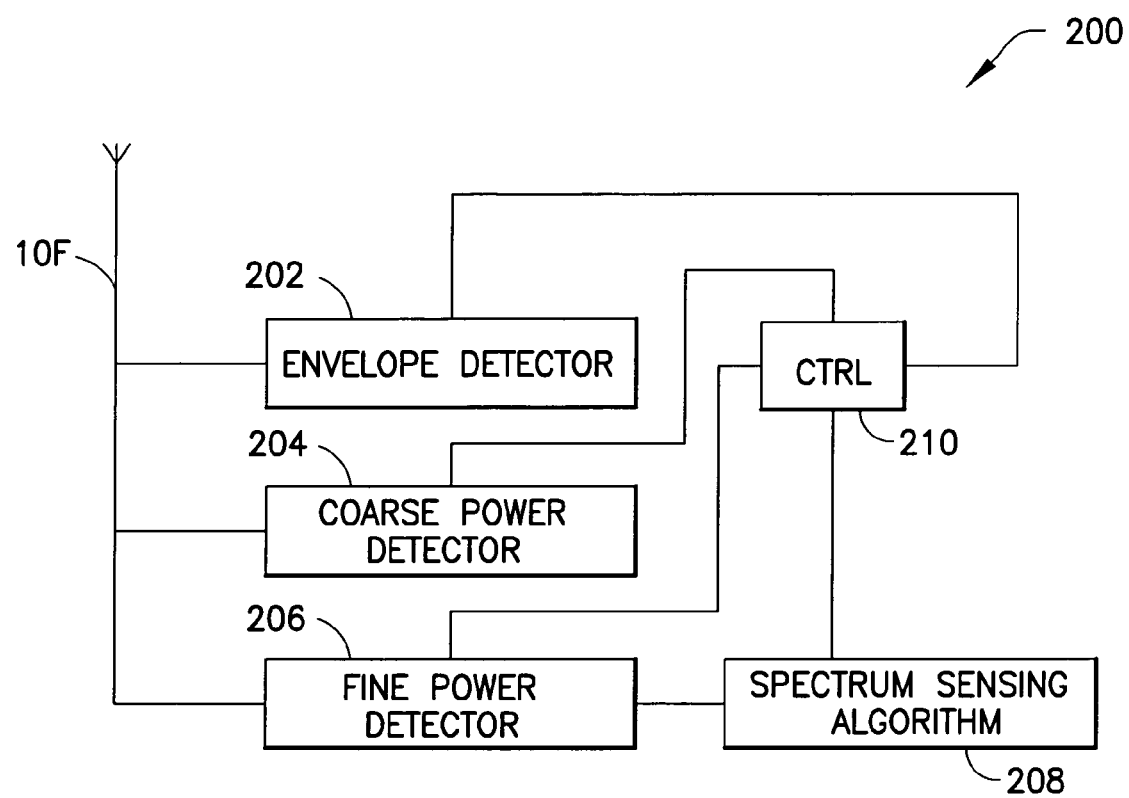
FIG. 2 is a high level block diagram of a cognitive terminal showing additional details as compared to FIG. 1B according to an embodiment of the invention.

Now that the details of the various embodiments are laid out, FIGS. 2 and 3 show different levels of detail for an exemplary embodiment of the invention. FIG. 2 is a higher level schematic and FIG. 3 is a more detailed schematic. Consider first FIG. 2 which shows the four main functions noted above: an envelope detector 202 that runs in the background during the three stage processing, a coarse power detector 204 that searches the wideband spectrum with low granularity and eliminates those bandwidth slices with higher signal levels, a fine power detector 206 that searches the bandwidth slices identified (not eliminated) by the coarse power detector 204, and the spectrum sensing block 208 that implements the spectrum detection algorithm. Additionally in FIG. 2 is a control-block 210 which sets the tunable parameters of each of the other blocks and also conveys other required information between the blocks (e.g., the identified slices from the coarse power detector 204 to the fine power detector 206). In one embodiment the control block 210 is the DP 10A of FIG. 1B. The entirety of FIG. 2 (excluding usually the antenna 10F and possibly pefiltering) is usually an ASIC 200, which includes another embodiment of the control block 210. FIG. 2 is a functional diagram and does not necessarily represent physical delineations between the circuitry that implements those functions. For example, it is common to preserve space on an ASIC to have circuits of one block interspersed among circuits of another block, and to share individual circuit devices among multiple functional blocks.

FIG. 3 depicts an exemplary embodiment in more detail than FIG. 2, and shows the four main functional portions: the envelope detector 302, the coarse power detector 304, the fine power detector 306 and the CR spectrum sensing block 308. Controllers are shown as 310 and 310' within the coarse power detector 304. The signal that is coming from the antenna or antennas 10F is fed into one chain or several separate chains (two chains in FIG. 3) according to frequency bands. The two or more chains are substantially identical but operating on different bands so only one chain is detailed with particularity here. The received signal is filtered at a bandpass filter 312 and amplified at a low noise amplifier 314. After that the signal branches to two paths in the FIG. 3 the top part containing the coarse power 304 and envelope detection 302 and the bottom part containing the fine power detection 306 and spectrum sensing block 308. Only main components are shown in FIG. 3 to improve clarity of this exemplary embodiment.

At the coarse power detector 304 the signal is amplified again at a variable gain amplifier 316 and downconverted to baseband at a mixer 318 that uses the output of a phase locked loop 322 driven by a voltage controlled oscillator 320. The coarse power detector 304 mixes the wideband-signal to baseband, filters it and performs a FFT to it. Most of the blocks of the coarse stage 304 are tunable in some properties though not specifically marked on the figure to prevent obscuring the more pertinent features. Sampling rate at the VCO 320 is controlled by a controller 310 to match the relevant frequency. The baseband signal is converted to digital at an ADC 324, passes through a low pass filter 326, the samples are then decimated by decimator 228 to a convenient number per interval, and then converted to a scaler 330. The scaler passes the samples through a FFT block where the signal is converted from time domain to frequency domain and at the FTT analyzer/power detector 336 a low-resolution analysis is made of the signal level. This is repeated among the two or more branches through the coarse power detector 304 for the various bandwidth slices, and the controller 310 or 310' drops those slices with higher signal level and retains those slices having the lower (or zero) signal levels for processing in the fine power detector 306. Other techniques apart from FFT/DFT are known to detect frequency spectrum in baseband processing, such as parallel filter banks. These and other substitutions can be readily made to the above exemplary embodiment of baseband processing, and without departing from these teachings the overall radiofrequency architecture can be direct conversion, low-intermediate frequency, heterodyne, or any of several other RF architectures known in the art.

After the mixer 318 the path is divided between I and Q branches. The main controlling is done to signal levels by tuning the VGA 316 and the scaler 330. The information for the tuning is collected from the ADC 324, power meter 234 and the FFT 332. Since the information for the most promising bands is conveyed to the fine power detector 306, a control from the FFT Analyzer 336 is drawn to the VCO 346 of the fine power stage 306 to represent that. The envelope detector 302 is shown as measuring the signal after the mixing 318, but the envelope detector input could be located to another suitable circuit node as well.

In the fine power detector 306 the tunable bandpass filter 312 is tuned to allow passage of a signal within one of the slices identified at the coarse power detector 304. Other identified slices are passed either through other branches of the fine power detector 306 or serially along the same branch. The VCO 346, PLL 348 and mixer 342 are similar to those described with reference to the coarse power detector 304. The variable gain amplifier 350, the tunable bandstop filter 352, ADC 354, and the tunable bandpass filter 356 are configurable for the fine power detection done in this stage 306, and can be dynamically operated to narrow the bandwidth slice by filtering, adjusting the frequency of the signal via the VCO, increasing resolution via the ADC using higher sample rates and/or reduced bandwidth of the slice, tuning the FFT parameters, and/or canceling RF interferers on either side of the signal path ADC 354 divides.

The fine power detector 306, after band-filtering 312 and amplification 314, contains a tunable bandstop filter 340. The bandstop filter is important for reducing the dynamic range requirements of the ADC 354. It can be tuned to filter out for example the largest nearby blocking signal. Several alternatives exist to realize this filter, but the exemplary implementation presented at FIG. 3 is not limiting to the invention. Then the signal is mixed 342 to baseband, divided to I and Q branches and filtered 344 before the ADC 354. Just before the ADC there is an additional bandstop-filter 352, with the same purpose of reducing the ADCs dynamic range requirements as before. Its physical realisation can be, however, completely different from the realization of the bandstop-filter 340 depending on the choices available to the designer. After the ADC 354, the bandpass filter 356 selects a suitable bandwidth for the spectrum sensing block 308. Like the coarse stage 304, a scaler 364 is placed after a decimator 360 but in this case there is also a mixer 362 interposed. What is finally output from the fine power detector stage 306 are those candidate frequency slices that, after this higher resolution processing, exhibit the least signal strength. They are output to the CR spectrum sensing block 308, which serially analyzes the candidate slices in rank order of the most promising (lowest signal strength) to the least until one is found that is decided as having sufficiently free spectrum. At that point an opportunistic transmission may be made from the CR 10. Excepting the antenna 10F, FIG. 3 may also be embodied as an ASIC or FPGA 300.

In some cases it will be possible to align coarse and fine spectrum sensing processes into different time slots (periods of time). In those cases many of the blocks shown in FIG. 3 can be shared, in which case those shared blocks can be configured to different operating conditions between the modes if needed.

It is anticipated that with current technologies, most of the signal processing functionality will be done with dedicated hardware elements and control with software. This is not a limit to the invention however, which is not dependent on a specific hardware/software/firmware implementation.

The above-described spectrum sensing technique is complete for spectrum detection with potentially low power consumption. It is suitable for wideband detection and mobile terminals. This solution can effectively perform RF pre-processing functions that reduce the resolution of A/D conversion and allows the optimization of power consumption with respect to signal levels over the time and bandwidth.

Figure 4:
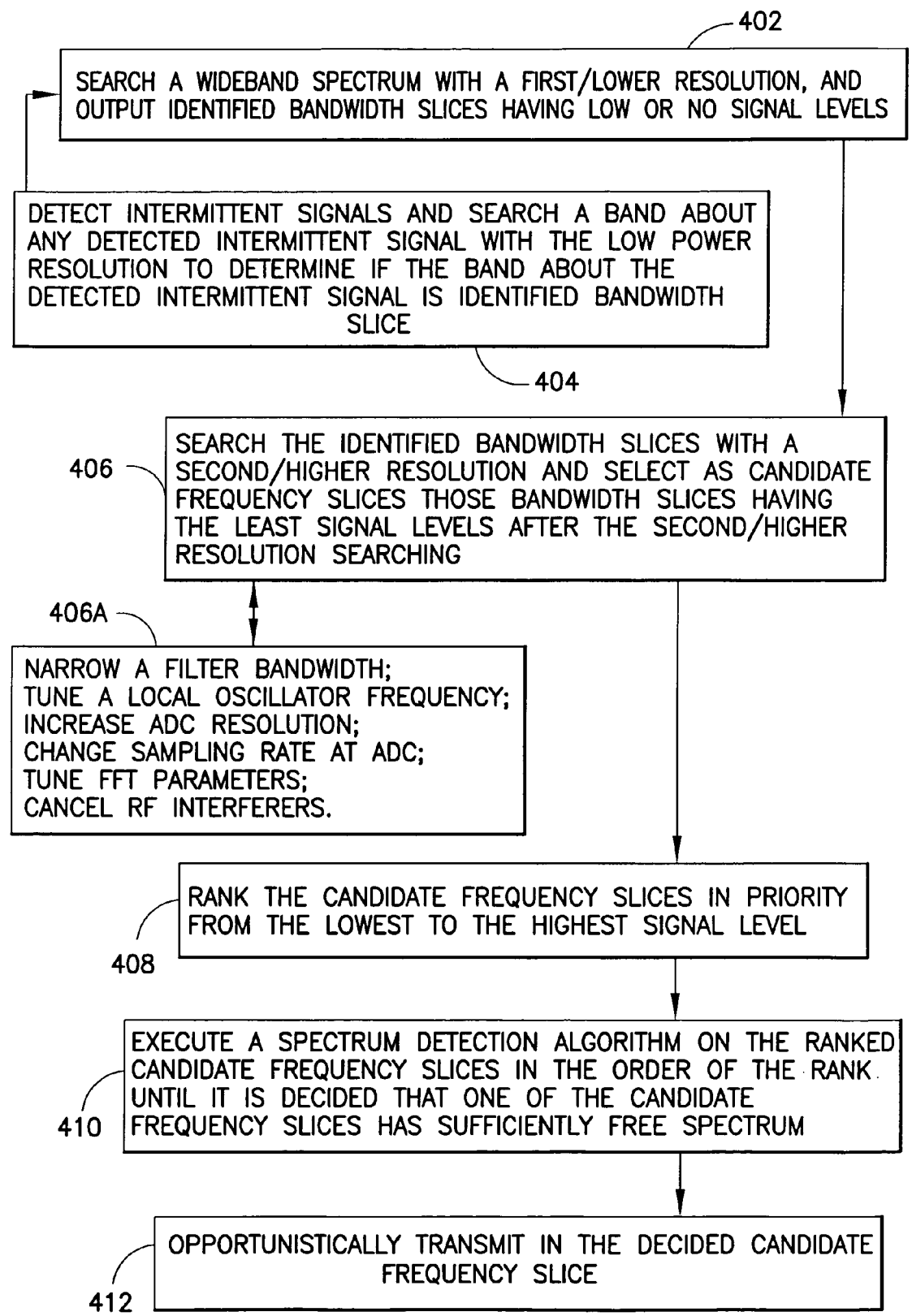
FIG. 4 is a process flow diagram detailing process steps according to an embodiment of the invention.

FIG. 4 is a flow chart from the perspective of a single user that illustrates one possible embodiment of the invention. At block 402 the wideband search with the first or lower resolution is performed, and the output is the identified bandwidth slices which have low or no signal level. In background while the entire process of FIG. 4 is ongoing (until the decision at block 410 at least) is also block 404 where intermittent signals are detected by an envelope detector. These intermittent signals are sent to block 402 where they are framed by a band about the intermittent signal or signals and that band is determined whether or not it is identified as having low or no signal level. At block 406 is the fine power search where the identified bands are searched with a second or higher resolution to select candidate frequency slices having the least signal levels after this fine search. Block 406A gives some possibilities how that might be accomplished, all of which are detailed above. The selected candidate frequency bands output from the second resolution/fine search at block 406 are ranked at block 408 in the order of the least signal level to the most, and at block 410 the spectrum detection algorithm is executed on the candidate frequency bands of slices in their ranked order until it is decided that one of them has sufficiently free spectrum. From that decision at block 410 then the transmitter at block 412 opportunistically transmits in the decided candidate frequency slice.

In general, the various embodiments may be implemented in hardware or special purpose circuits, software (computer readable instructions embodied on a computer readable medium), logic or any combination thereof. For example, some aspects such as the sequence generator may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation such as FIG. 4, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the invention may be practiced in various components such as integrated circuit modules. The design of integrated circuits ICs is by and large a highly automated process. Complex and powerful software tools are available for converting a logic level design into a semiconductor circuit design ready to be etched and formed on a semiconductor substrate. FIG. 3 may represent specific circuit functions of such an IC.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention.

Although described in the context of particular embodiments, it will be apparent to those skilled in the art that a number of modifications and various changes to these teachings may occur. Thus, while the invention has been particularly shown and described with respect to one or more embodiments thereof, it will be understood by those skilled in the art that certain modifications or changes may be made therein without departing from the scope and spirit of the invention as set forth above, or from the scope of the ensuing claims.

We claim:

1. A method comprising:
    searching a wideband spectrum with a first resolution to identify at least those bandwidth slices having low or no signal levels relative to other bandwidth slices of the wideband spectrum, in which the signal level per bandwidth slice according to the first resolution comprises a sum of signals detected in the bandwidth slice and weighted by signal strength;
    searching the identified bandwidth slices with a second resolution that is higher than the first resolution and selecting as candidate frequency slices those bandwidth slices having least signal levels after the second resolution searching;
    executing a spectrum detection algorithm on at least one of the selected candidate frequency slices and deciding that it has sufficiently free spectrum;
    transmitting in the decided candidate frequency slice; and
    after searching the identified bandwidth slices with the second resolution, ranking the candidate frequency slices in priority from a first bandwidth slice of the candidate frequency slices having a lowest signal level within the first bandwidth slice, to a second bandwidth slice of the candidate frequency slices having a highest signal level within the second bandwidth slice;
    wherein executing the spectrum detection algorithm is performed on the ranked candidate frequency slices in the order of the priority until it is decided that one of the candidate frequency slices has sufficiently free spectrum.

2. The method of claim 1, wherein searching the identified bandwidth slices with the second resolution comprises narrowing a frequency range of at least one of the identified bandwidth slices.

3. The method of claim 1, wherein transmitting comprises opportunistically transmitting in the decided candidate frequency slice.

4. The method of claim 1, wherein searching the identified bandwidth slices with the second resolution comprises at least two of the set: narrowing a filter bandwidth; tuning a local oscillator frequency; increasing analog to digital converter resolution while reducing bandwidth of one of the identified bandwidth slices; changing sampling rate at an analog to digital converter; tuning fast Fourier transform parameters; and canceling radio frequency interferers.

5. The method of claim 1 wherein searching the wideband spectrum with the first resolution is done faster than searching the identified bandwidth slices with the second resolution.

6. The method of claim 1, further comprising controlling radio frequency gain of the search of the wideband spectrum and the search of the identified bandwidth slices with a radio frequency envelope detector to reduce dynamic range of analog to digital conversions done in the said searches.

7. The method of claim 1, wherein searching the wideband spectrum with the first resolution is executed in parallel over multiple frequency bins that span the wideband spectrum.

8. The method of claim 1, further comprising:
detecting intermittent signals with an envelope detector and searching a band about any detected intermittent signal with the first resolution to determine if the band about the detected intermittent signal is an identified bandwidth slice.

9. The method of claim 1 executed by a handheld mobile terminal.

10. An apparatus comprising:
a coarse power detector configured to search a wideband spectrum with a first resolution to identify at least those bandwidth slices having low or no signal levels relative to other bandwidth slices of the wideband spectrum, in which the signal level per bandwidth slice according to the first resolution comprises a sum of signals detected in the bandwidth slice and weighted by signal strength;
a fine power detector configured to search the identified bandwidth slices with a second resolution that is higher than the first resolution and to select as candidate frequency slices those bandwidth slices having least signal levels after the second resolution searching;
a spectrum detector configured to execute a spectrum detection algorithm on at least one of the selected candidate frequency slices;
a processor configured to decide that the at least one of the selected candidate frequency slices has sufficiently free spectrum; and
a transmitter configured to transmit in the decided candidate frequency slice;
wherein the processor is configured to rank the candidate frequency slices in priority from a first bandwidth slice of the candidate frequency slices having a lowest signal level within the first bandwidth slice, to a second bandwidth slice of the candidate frequency slices having a highest signal level within the second bandwidth slice; and
wherein the spectrum detector is configured to execute the spectrum detection algorithm on the ranked candidate frequency slices in the order of the priority until the processor decides that one of the candidate frequency slices has sufficiently free spectrum.

11. The apparatus of claim 10, wherein the fine power detector is configured to narrow a frequency range of at least one of the identified bandwidth slices while searching the identified bandwidth slices.

12. The apparatus of claim 10, wherein the transmitter is configured to opportunistically transmit in the decided candidate frequency slice.

13. The apparatus of claim 10, wherein the fine power detector is configured to search the identified bandwidth slices with the second resolution by at least two of the set: narrowing a filter bandwidth; tuning a local oscillator frequency; increasing analog to digital converter resolution while reducing bandwidth of one of the identified bandwidth slices; changing sampling rate at an analog to digital converter; tuning fast Fourier transform parameters; and canceling radio frequency interferers.

14. The apparatus of claim 10, wherein the coarse power detector is configured to search the wideband spectrum with the first resolution faster than the fine power detector searches the identified bandwidth slices with the second resolution.

15. The apparatus of claim 10, further comprising a radio frequency envelope detector configured to reduce dynamic range of analog to digital conversions done within the coarse power detector and within the fine power detector by controlling radio frequency gain of the coarse power detector and of the fine power detector.

16. The apparatus of claim 10, wherein the coarse power detector comprises circuitry that executes in parallel the first resolution search over frequency bins of the wideband spectrum.

17. The apparatus of claim 10, further comprising:
an envelope detector configured to detect intermittent signals; and wherein the coarse power detector is configured to search frequency bands about the detected intermittent signals with the first resolution to determine if the band about the detected intermittent signal is an identified bandwidth slice.

18. The apparatus of claim 10, the apparatus comprising a handheld mobile terminal.

19. The apparatus of claim 10, the apparatus comprising an integrated circuit.

20. A computer readable memory embodying a program of machine-readable instructions executable by a digital data processor to perform actions directed toward searching spectrum for a frequency band available for transmission, the actions comprising:
searching a wideband spectrum with a first resolution to identify at least those bandwidth slices having low or no signal levels relative to other bandwidth slices of the wideband spectrum, in which the signal level per bandwidth slice according to the first resolution comprises a sum of signals detected in the bandwidth slice and weighted by signal strength;
searching the identified bandwidth slices with a second resolution that is higher than the first resolution and selecting as candidate frequency slices those bandwidth slices having least signal levels after the second resolution searching;
executing a spectrum detection algorithm on at least one of the selected candidate frequency slices and deciding that it has sufficiently free spectrum; and
after searching the identified bandwidth slices with the second resolution, ranking the candidate frequency slices in priority from a first bandwidth slice of the candidate frequency slices having a lowest signal level within the first bandwidth slice, to a second bandwidth slice of the candidate frequency slices having a highest signal level within the second bandwidth slice;
wherein executing the spectrum detection algorithm is performed on the ranked candidate frequency slices in the order of the priority until it is decided that one of the candidate frequency slices has sufficiently free spectrum.

21. The computer readable memory of claim 20, wherein searching the identified bandwidth slices with a second resolution comprises narrowing a frequency range of at least one of the identified bandwidth slices.

22. The computer readable memory of claim 20, further comprising opportunistically transmitting in the decided candidate frequency slice.

23. The computer readable memory of claim 20, wherein searching the identified bandwidth slices with the second resolution comprises at least two of the set: narrowing a filter bandwidth; tuning a local oscillator frequency; increasing analog to digital converter resolution while reducing bandwidth of one of the identified bandwidth slices; changing sampling rate at an analog to digital converter; tuning fast Fourier transform parameters; and canceling radio frequency interferers.

24. The computer readable memory of claim 20, further comprising controlling radio frequency gain of the search of the wideband spectrum and the search of the identified bandwidth slices with a radio frequency envelope detector to reduce dynamic range of analog to digital conversions done in the said searches.

25. The computer readable memory of claim 20, wherein searching the wideband spectrum with the first resolution is executed in parallel over multiple frequency bins that span the wideband spectrum.

26. The computer readable memory of claim 20, further comprising:
   detecting intermittent signals with an envelope detector and searching a band about any detected intermittent signal with the second resolution to determine if the band about the detected intermittent signal is an identified bandwidth slice.

27. An apparatus comprising:
   a processor and a memory including computer program code, the computer program code being configured, with the processor, to cause the apparatus to perform at least the following:
   searching a wideband spectrum with a first resolution to identify at least those bandwidth slices having low or no signal levels relative to other bandwidth slices of the wideband spectrum, in which the signal level per bandwidth slice according to the first resolution comprises a sum of signals detected in the bandwidth slice and weighted by signal strength;
   searching the identified bandwidth slices with a second resolution that is higher than the first resolution and selecting as candidate frequency slices those bandwidth slices having least signal levels after the second resolution searching;
   ranking the candidate frequency slices in priority from a first bandwidth slice of the candidate frequency slices having a lowest signal level within the first bandwidth slice, to a second bandwidth slice of the candidate frequency slices having a highest signal level within the second bandwidth slice;
   detecting spectrum on the ranked candidate frequency slices in the order of the priority until one of the candidate frequency slices has been identified as having sufficiently free spectrum; and
   transmitting in the identified candidate frequency slice.

* * * * *